United States Patent
McMichael et al.

(10) Patent No.: US 6,665,786 B2
(45) Date of Patent: Dec. 16, 2003

(54) DYNAMIC DISK PARTITION MANAGEMENT

(75) Inventors: Lonny D McMichael, Redmond, WA (US); Norbert P. Kusters, Woodinville, WA (US); Peter W. Wieland, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,881

(22) Filed: Sep. 21, 1998

(65) Prior Publication Data

US 2003/0023826 A1 Jan. 30, 2003

(51) Int. Cl.$^7$ ............................................. G06F 12/00
(52) U.S. Cl. ...................... 711/173; 711/111; 707/203; 707/205
(58) Field of Search ................ 711/173, 111; 707/205, 203; 710/1

(56) References Cited

U.S. PATENT DOCUMENTS

| | | | | |
|---|---|---|---|---|
| 5,129,088 A | * | 7/1992 | Auslander et al. | 711/173 |
| 5,435,004 A | * | 7/1995 | Cox et al. | 707/205 |
| 5,546,557 A | * | 8/1996 | Allen et al. | 711/11 |
| 5,706,472 A | * | 1/1998 | Ruff et al. | 711/173 |
| 5,761,526 A | * | 6/1998 | Sakakura et al. | 710/1 |
| 5,930,831 A | * | 7/1999 | Marsh et al. | 711/173 |
| 6,119,131 A | * | 9/2000 | Cabrera et al. | 707/203 |
| 6,119,212 A | * | 9/2000 | Gross et al. | 711/173 |

\* cited by examiner

*Primary Examiner*—Matthew Kim
*Assistant Examiner*—Brian R. Peugh
(74) *Attorney, Agent, or Firm*—Lee & Hayes PLLC (57) ABSTRACT

A partition manager enables the dynamic creation, reconfiguration, and deletion of logical volumes as non-removable storage devices are connected, reconfigured, or disconnected in a computer system by assigning partitions on a connected device to volume managers which create the logical volumes, and by removing the assignment when the device is disconnected or reconfigured. The partition manager receives notification from the operating system of the arrival of new volume managers in a system. When new partitions are created on a non-removable storage device in the system by a device driver, the partition manager intercepts the partitions before they can be registered with the operating system. The partition manager queries each volume manager, in order of their arrival in the system, as to whether the volume manager handles a particular new partition and assigns control of the partition to the appropriate volume manager. The partition manager associates the partition with the appropriate volume manager in an in-memory partition manager database. The partition manager also removes a partition from the control of the associated volume manager and disassociates the partition from the volume manager when the partition is inaccessible.

17 Claims, 6 Drawing Sheets

DYNAMIC DISK PARTITION MANAGEMENT

RELATED APPLICATIONS

This application is related to co-assigned U.S. patent applications titled "Logical Volume Mount Manager", having Ser. No. 09/096,772, filed Jun. 12, 1998; "Persistent Names for Logical Volumes," having Ser. No. 09/096,540, filed Jun. 12, 1998; and "Persistent Volume Mount Points", filed Jun. 12, 1998, and now issued as U.S. Pat. No. 6,119,131, which are all hereby incorporated by reference.

FIELD OF THE INVENTION

This invention relates generally to computer storage device configuration, and more particularly to the management of dynamic partitions on a disk storage device.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright©1997, Microsoft Corporation, All Rights Reserved.

BACKGROUND OF THE INVENTION

When a computer boots, the operating system recognizes the physical storage devices present in the computer. Before a fixed-disk storage device can be used, the disk must be formatted by creating logical partitions which correspond to physical locations on the device. The physical address of the beginning and ending of each logical partition on a disk are stored in an area on the disk that is managed by the operating system or a file system component. One partition is created that represents the entire disk.

Each partition is given a device name that is used to address the data in the partition. The partition that represents the entire disk and permits I/O access to all the data on the disk is frequently called "partition 0." The partitions representing sub-divisions of the disk are usually numbered starting with "1." Because there can be more than one fixed disk in a system, each partition is uniquely identified based on the position of the partition in a device hierarchy so partition0 on the first hard disk in a computer is named "/device/harddisk0/partition0," partition1 on the first hard disk is named "/device/harddisk0/partition1," etc. The unique device names of all the partitions in a computer are stored in a "disk stack" which is managed by the operating system or the file system component.

In order to enable higher layers of the operating system and user applications to access data, an operating system must create logical volumes from the partitions. The component of an operating system that creates and manages the logical volumes is often referred to as a volume manager. Typically, a volume manager works only with partitions that represent sub-divisions of a disk to create logical volumes from one or more partitions, or multiple logical volumes from a single partition.

The operating system creates an internal logical representation of each of the partitions and logical volumes in the system. The logical representations can be tables or data bases entries. In an object-based operating system such as the MICROSOFT WINDOWS NT® operating system family, the internal logical representation of a partition is a partition device object. For a logical volume created from a set of multiple partitions, the partition device object for the first partition in the set is used to represent all the partitions in the logical volume. The remaining partition device objects in the set were not individually addressable so that I/O requests directed to one of the other partition device objects fail.

The existing methods for creating and addressing logical volumes spanning multiple partitions have major drawbacks. For example, logical volumes are frequently created from a set of partitions to enable the "striping" of the data across all the partitions as a fail-safe mechanism. When a partition in the set fails, the data on the failed partition is recreated on the remaining partitions in the set. However, if the failed partition is the first partition in the set, the logical volume continues to be addressed using the name of the partition device object of the first partition. Therefore, such partition device objects must be maintained within the system even though the corresponding partition is no longer available or the data cannot be accessed without modifying the software that references the objects.

Furthermore, as operating systems are enhanced to allow dynamic changes in the physical configuration of a computer during a boot session, devices can be introduced and then removed without rebooting the system. In current operating systems, the partition device objects created when the device was introduced cannot be deleted when the device is removed.

Therefore, there is a need in the art for an operating system that supports dynamic changes in the characteristics of physical devices underlying logical volumes without requiring that the higher layers of the operating system and user applications modify the addresses of the logical volumes.

SUMMARY OF THE INVENTION

The above-mentioned shortcomings, disadvantages and problems are addressed by the present invention, which will be understood by reading and studying the following specification.

A partition manager enables the dynamic creation, reconfiguration, and deletion of logical volumes as non-removable storage devices are introduced, reconfigured, or deleted in a computer system by assigning partitions on a storage device to volume managers which create the volumes, and by removing the assignment when partitions are inaccessible by the system due to the deletion or reconfiguration of the device.

The partition manager receives notification from the operating system of the arrival of new volume managers in a system. When new partitions are enumerated on a storage device by a device driver, the partition manager intercepts the partitions before they can be registered with the operating system. The partition manager queries each volume manager, in order of their arrival in the system, as to whether the volume manager handles a particular partition and assigns control of the partition to the appropriate volume manager. Each volume manager enumerates logical volumes from a partition or a combination of partitions.

When a storage device is being reconfigured, deleted or modified partitions are removed from the system. The operating system notifies the partition manager of the partitions affected by the reconfiguration and the partition manager determines what volume manager(s) manage the affected partitions. The partition manager notifies the appropriate volume managers and removes the affected partitions from the control of the volume managers. When partitions becomes unavailable to the system because the underlying device is deleted from the system, the partition manager determines the volume managers that manage the unavailable partitions, queries the volume managers for the logical volumes that are dependent on the unavailable partitions, and informs the operating system of the volume dependencies. When the device is disconnected from the system, the partition manager removes the unavailable partitions from the control of the volume managers.

The present application describes computer systems, methods, and computer-readable media of varying scope. The partition manager is variously described as causing the processor of a computer to perform certain actions, as a series of instructions executed from a computer-readable medium, and in terms of its interaction with objects and other system components in an object-based operating system. An in-memory data structure to store the associations between the partitions and the volume manager is also described.

The level of indirection introduced by the partition manager permits flexibility in addressing logical volumes regardless of the underlying partitions that comprise the logical volume. Thus, the physical characteristics of a logical volume can change dynamically without the necessity of modifying the higher layers of the operating system and the user applications that reference the logical volume. Furthermore, because the partition manager manages the interface between partition objects and an object-based operating system, partition objects can be deleted when the corresponding partition fails or is removed.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular MICROSOFT WINDOWS NT® 5.0 implementation of the invention is described. Finally, in the fifth section, a conclusion of the detailed description is provided.

Hardware and Operating Environment

Figure 1:
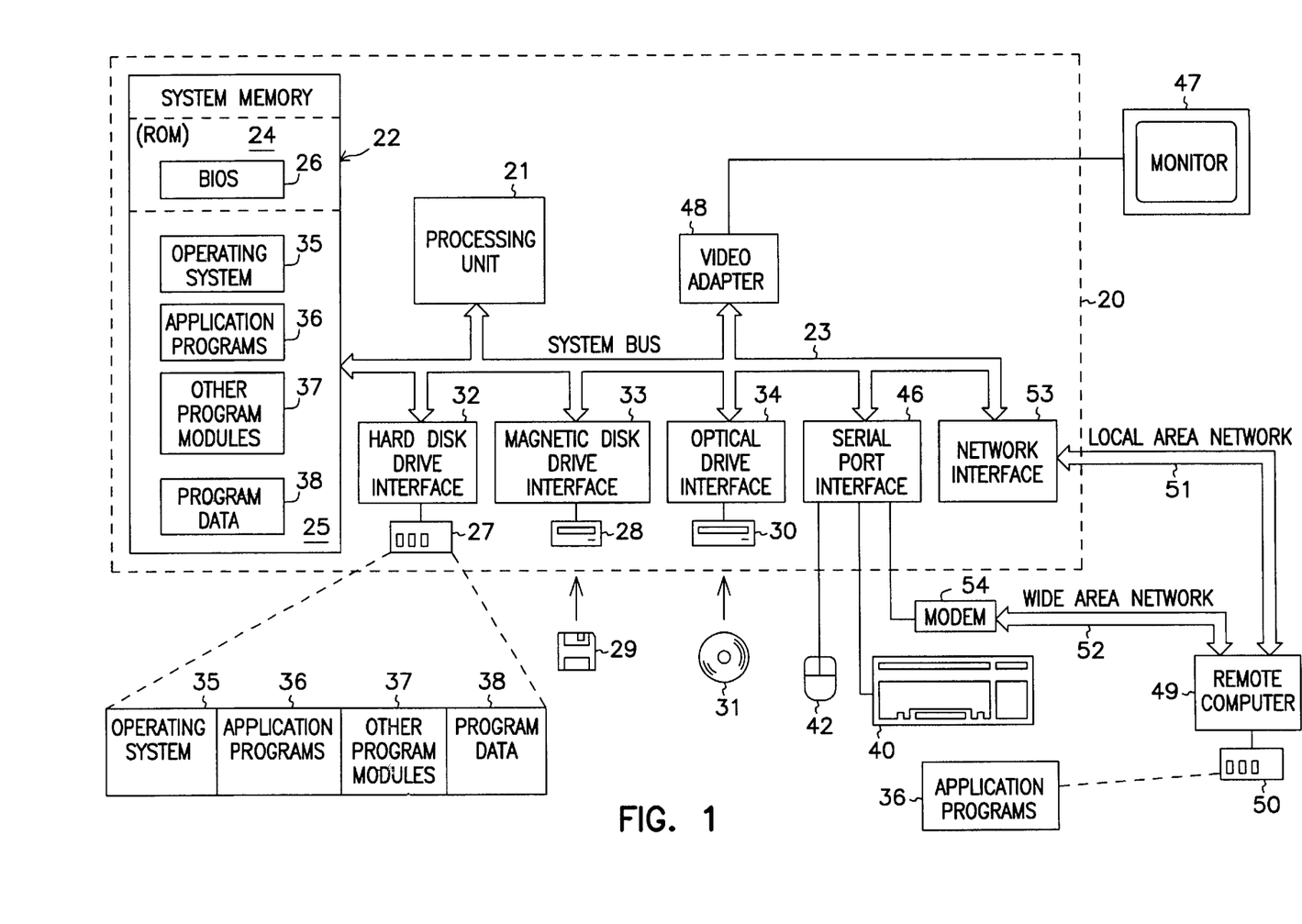
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2A:
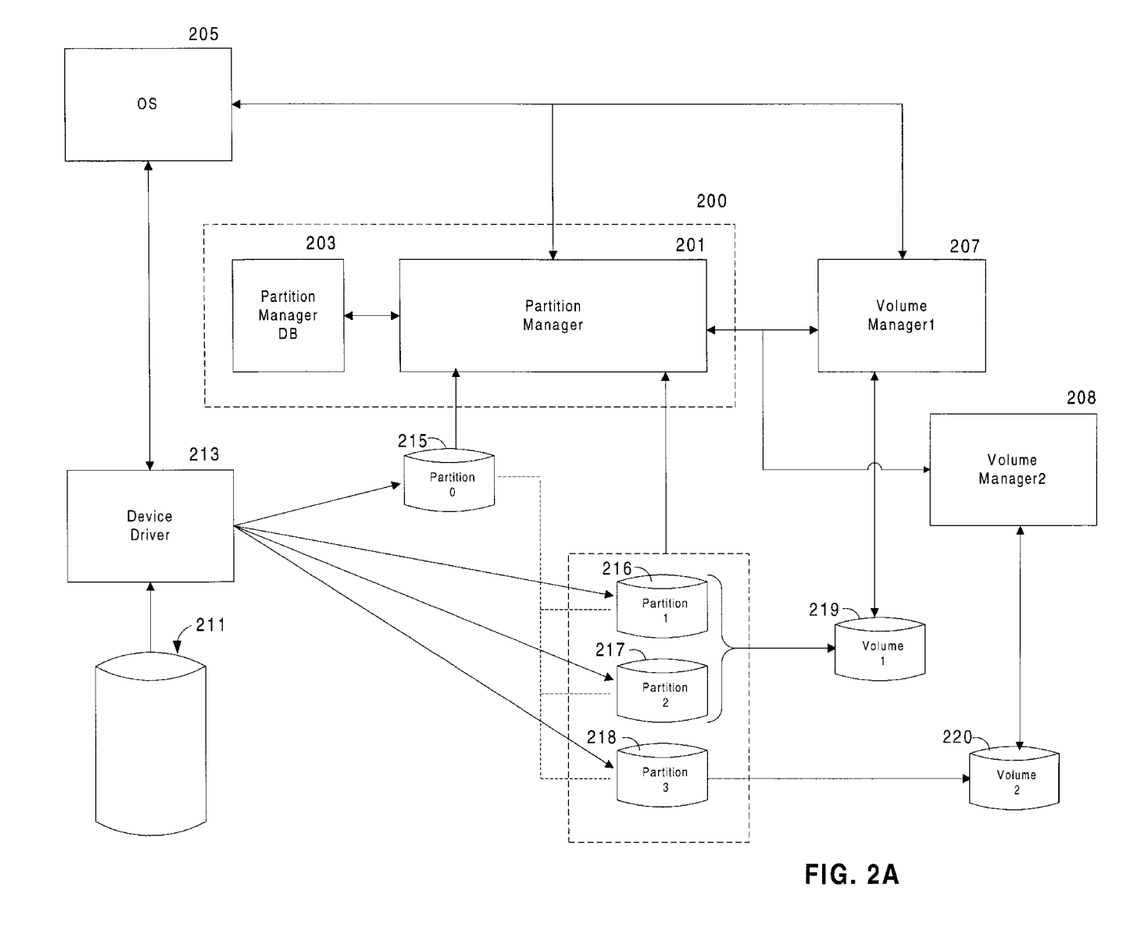
FIG. 2A is a diagram illustrating a system-level overview of an exemplary embodiment of the invention.
Figure 2B:
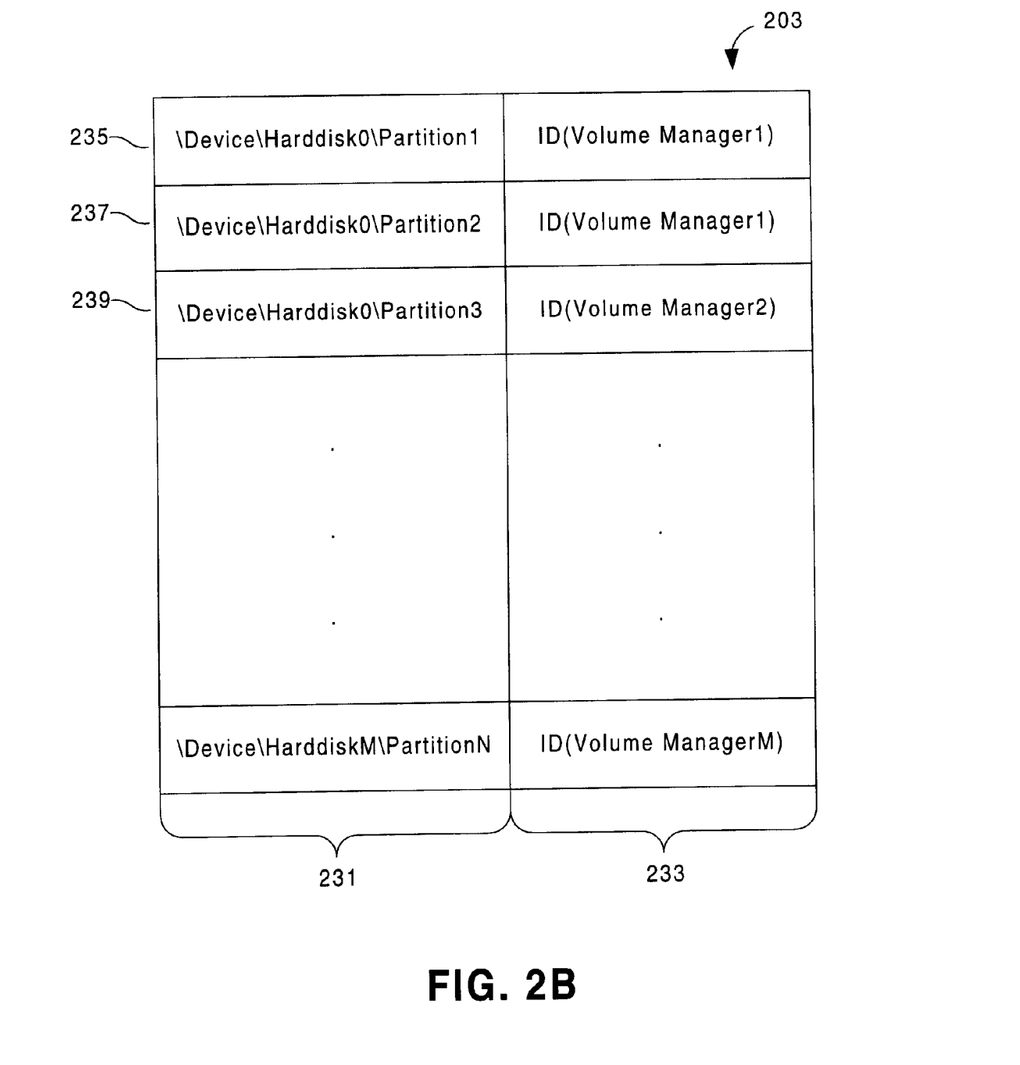
FIG. 2B is a diagram illustrating an exemplary embodiment of a data structure used in the embodiment of the invention shown in FIG. 2A.

A system level overview of the operation of an exemplary embodiment of the invention is described by reference to FIGS. 2A and 2B. FIG. 2A shows one embodiment of a partition management subsystem 200, executing in a computer such as local computer 20 or remote computer 49 in FIG. 1, to manage partitions on a physical media, such as hard disk drive 27 in local computer 20.

Referring to FIG. 2A, the partition management subsystem 200 comprises a partition manager 201 and an in-memory partition manager data structure 203. An exemplary embodiment of the partition manager data structure 203 is described in more detail below. In the present embodiment, the partition manager 201 is a component of an operating system 205 and works in conjunction with two volume managers 207, 208. The partition manager 201 manages the logical partitions used by the volume managers 207–208 to create logical volumes. Alternate embodiments having a single volume manager or more than two volume managers are contemplated as within the scope of the invention and the operation of the invention in such alternate embodiments will be readily apparent to one skilled in the art upon reading the detailed description of the invention. Furthermore, the invention is applicable in environments in which the allocation of functions between the volume manager(s) and the partition manager as described herein are not strictly duplicated.

When the computer is booted, the partition manager 201 requests that the operating system 205 notify the partition manager when a volume manager registers to handle logical volumes. When the volume manager1 207 and volume manager2 208 register, the operating system 205 notifies the partition manager 201 which records the order in which the volume managers have registered. In one embodiment, the partition manager 201 maintains the order in a linked list. In an alternate embodiment, the partition manager 201 maintains the order in a table. Additional alternate embodiments using other data structures to maintain the order of the volume managers will be readily apparent to one skilled in the art and are considered within the scope of the invention.

When a storage device, shown as fixed hard disk 211, is recognized by the operating system 205, the operating system 205 invokes a device driver 213 to handle access to the device at a physical level. The device driver 213 "enumerates" a partition0 215 for the whole disk 211 and three "children" partitions, partition1 216, partition2 217, and partition3 218 based on the format information stored on the disk 211. As partition1 216, partition2 217, and partition3 218 are enumerated, the partition manager 201 intercepts each child partition before it can be registered with the operating system 205 by the device driver 213. Thus, to the operating system 205, disk 211 appears to have only partition0 215. The partition manager 201 manages the interface between the operating system 205 and the children partitions 216–218 so that operations on the children partitions are unchanged even though the children partitions are not directly recognized by the operating system 205.

As the partition manager 201 captures each partition, it presents the partition to the registered volume managers in the order in which they registered. Each volume manager determines if one of its logical volumes requires the partition based on the disk format information. If so, the volume manager accepts the partition. Referring to FIG. 2A, the volume manager1 207 registered first and accepts both partition1 216 and partition2 217 when they are presented to it by the partition manager 201 because partition1 216 and partition2 217 comprise logical volume1 219 which is managed by the volume manager1 207. The volume manager1 207 does not accept partition3 218 when it is presented, so the partition manager 201 presents the partition3 218 to the volume manager2 208. The volume manager2 208 accepts the partition3 218 because it comprises logical volume2 220 which is managed by volume manager2 208.

As each partition is accepted by a volume manager, the partition manager 201 records a device name for the partition and a unique identifier for the accepting volume manager in the partition manager data structure which associates the partition with the volume manager. FIG. 2B shows one embodiment of a partition manager data structure 203 that illustrates the relationship among the partitions and volume managers shown in FIG. 2A. Each entry 235, 237, 239 in the data structure 203 consists of a partition device name field 231 and a volume manager identifier field 233. Entries 235, 237 indicate that partition1 216 and partition2 217 are used by volume manager1 207 while entry 239 indicates that partition3 218 is used by volume manager2 208. The partition manager data structure 203 is rebuilt in memory upon each reboot of the computer as the devices are introduced into the computer because the device names for the partitions are not guaranteed to be persistent across boots.

Each volume manager determines when it has received a sufficient number of partitions to create the corresponding logical volume and such determination is independent of the other volume managers in the system and the partition manager 201. There can be a one-to-many, many-to-one, or one-to-one relationship between the partitions and the corresponding logical volumes enumerated by a volume manager. Once the volume manager has enumerated a logical volume from the partition(s), a device name for the logical volume is used to access the data on the underlying partition (s).

The partition manager 201 disassociates a partition from its volume manager when the partition is inaccessible by the system due to the deletion or reconfiguration of the device.

When the partition manager 201 is notified by the operating system that the disk 211 is being deleted from the system, the partition manager 201 uses its data structure 203 to determine the partitions affected and the volume manager (s) which are using the partitions. The partition manager 201 conveys this information to the operating system 205 so that the operating system 205 can notify the appropriate volume manager(s) of the removal of the device. The partition manager 201 then updates its data structure 203 to reflect the changes.

Similarly, the partition manager 201 removes a partition from a volume manager's control and updates its data structure 203 when the partition is unavailable due to reconfiguration of the underlying storage device. The handling of device deletions and reconfigurations is explained in more detail in the next section.

The system level overview of the operation of an exemplary embodiment of the invention has been described in this section of the detailed description. The partition manager has been described as managing the assignment of partitions on a storage device to volume managers for incorporation into logical volumes. While the invention is not limited to any particular operating environment, for sake of clarity a simplified version of an operating system, device driver and volume managers, have been described.

Methods of an Exemplary Embodiment of the Invention

In the previous section, a system level overview of the operation of an exemplary embodiment of the invention was described. A computer executing an exemplary embodiment is described by reference to a series of flowcharts. The methods to be performed by a computer constitutes computer programs made up of computer-executable instructions. Describing the methods by reference to a flowchart enables one skilled in the art to develop such programs including such instructions to carry out the methods on suitable computers (the processor of the computers executing the instructions from computer-readable media). The methods are illustrated in FIGS. 3A–D and are inclusive of the acts required to be taken by the partition manager 201 operating in the environment shown in FIGS. 2A–B.

Figure 3A:
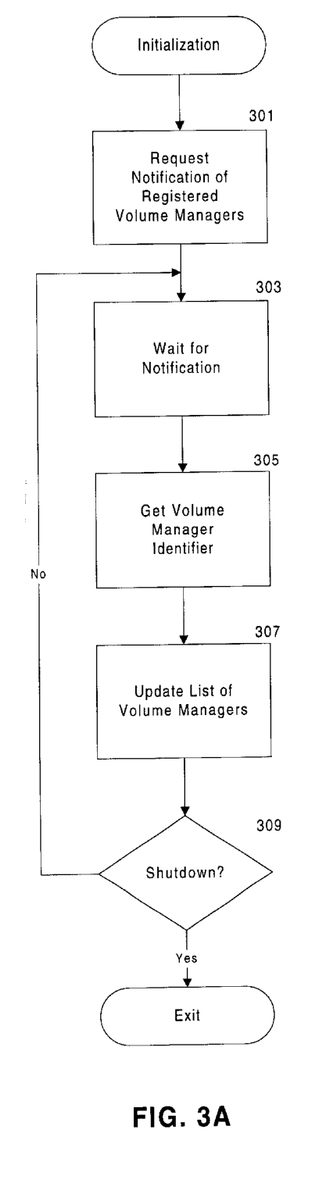
FIGS. 3A, 3B, 3C and 3D are flowcharts of methods to be performed by a computer according to an exemplary embodiment of the invention.

Referring first to FIG. 3A, when the computer is booted, the partition manager 201 performs a series of initialization actions. The partition manager 201 requests that the operating system 205 notify the partition manager 201 when a volume manager registers with the operating system (block 301). When the partition manager 201 is notified (block 303), it gets the unique volume manager identifier (block 305) and stores the identifier in an ordered list or other type of sorted data structure (block 307) based on the order in which partition manager receives the registration notification. The partition manager 201 continues to wait for registration notifications until the computer is shutdown (block 309).

Figure 3B:
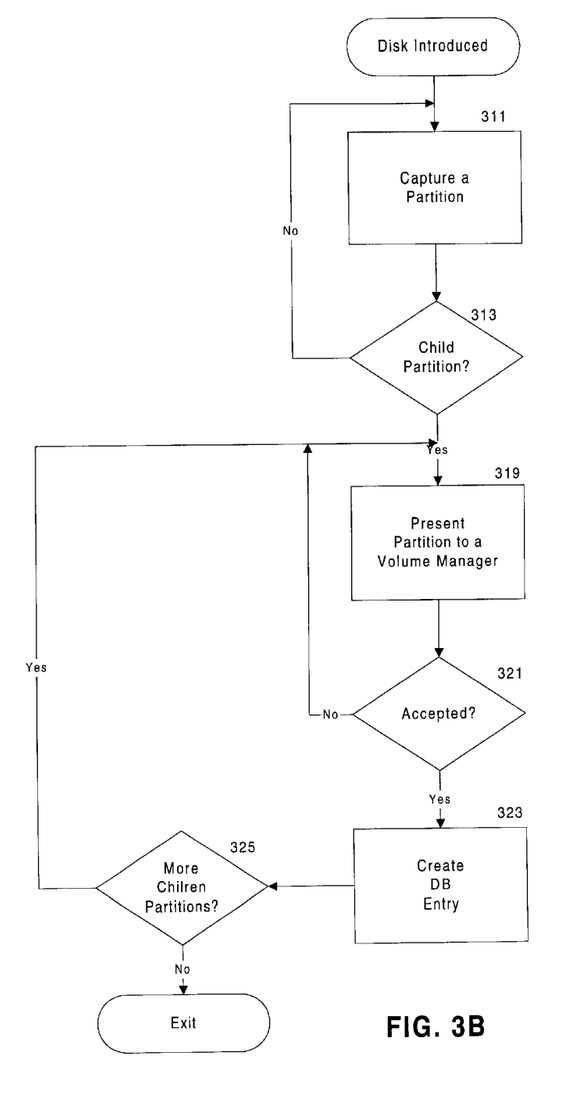
Figures 3C, 3D:
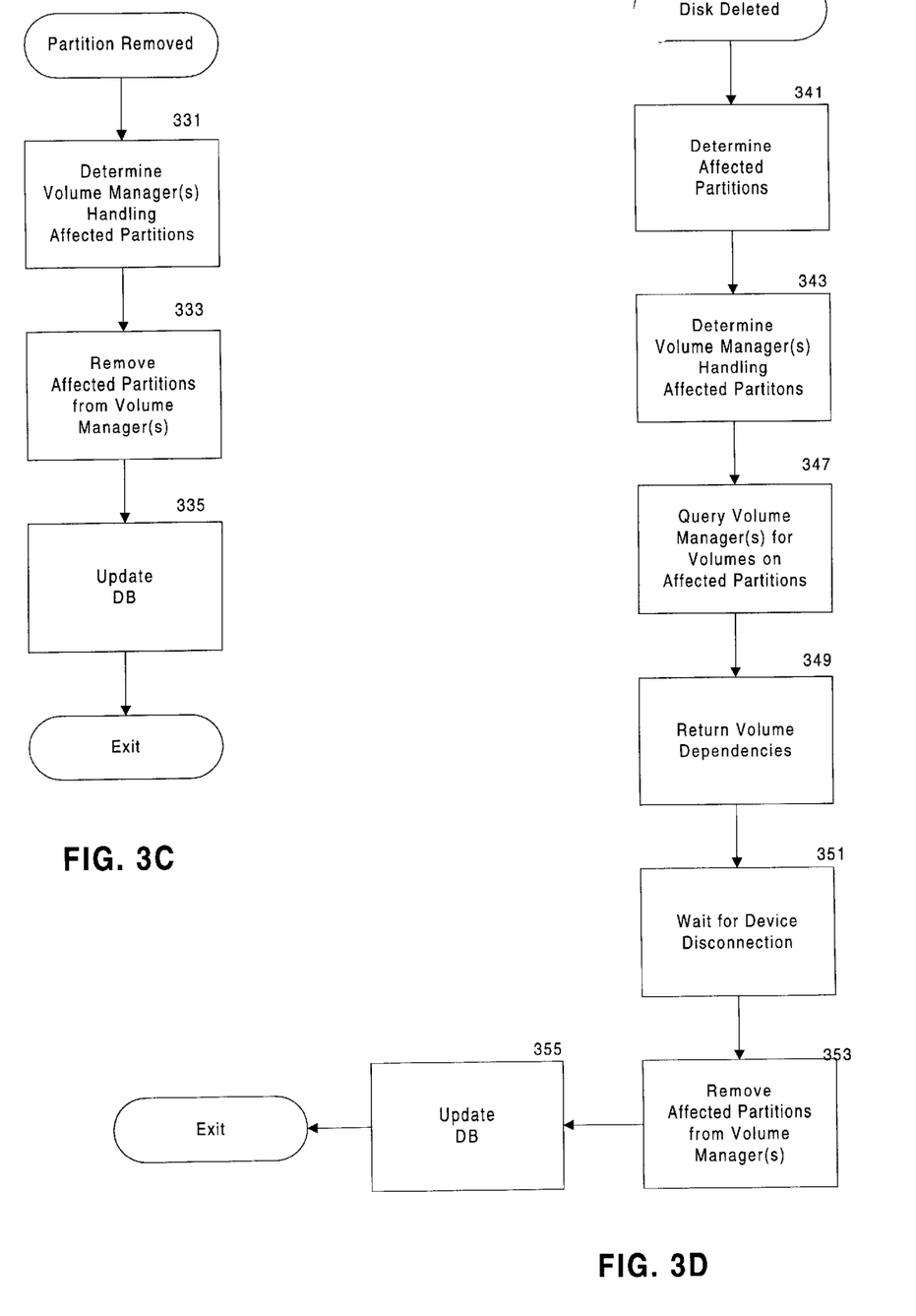

The partition manager 201 is also notified by the operating system 205 when a fixed hard disk is introduced into the computer (FIG. 3B), when a disk is reconfigured (FIG. 3C), and when a disk is removed from the system (FIG. 3D).

Referring now to FIG. 3B, when the partition manager 201 is notified that a disk is introduced into the computer, the partition manager 201 intercepts each partition as it is enumerated by the device driver 213 and before it can be registered with the operating system 205 (block 311). The partition manager 201 presents each child partition to each of the volume managers in the order in which the volume managers registered with the operating system 205 (block 319). When a volume manager accepts the partition (block 321), the partition manager 201 creates a corresponding entry in the partition manager data structure 203 (block 323).

If a disk is reconfigured, i.e., reformatted, some existing partitions on the disk can be deleted or modified while others are unchanged. Under such circumstances, the logical volumes corresponding to the deleted or modified partitions are rendered invalid and essentially removed from the system. When the operating system 205 informs the partition manager 201 that a partition is removed, the partition manager 201 uses its data structure 203 to determine which volume manager controls the partition (block 331 in FIG. 3C). The partition manager 201 informs the appropriate volume manager of the removal and removes the partition from the control of the volume manager (block 333). The partition manager 201 also updates its data structure 203 to reflect the fact that the volume manager no longer controls the partition (block 335). If the partition is modified, the partition manager 201 will capture the modified partition as it is enumerated by the device driver 213 and process it as a new partition as described above in conjunction with FIG. 3B.

The partitions on an existing disk become unavailable if the disk is either deliberately or accidentally deleted from the computer system. The handling of both situations is illustrated in FIG. 3D.

When an existing disk in a computer system is to be deliberately deleted from the system configuration, the operating system 205 requests the volume dependencies from the partition manager 201 (FIG. 3D). The partition manager uses its data structure 203 to determine the partitions which will be deleted as a result (block 341) and to identify the volume managers which handle the affected partitions (block 343). The partition manager 201 queries each of the identified volume managers to determine what logical volumes are dependent upon the affected partitions (block 347). The partition manager 201 returns the volume dependencies (i.e., the identities of the volume managers and the corresponding logical volumes) to the operating system 205 (block 349) so the operating system can request approval for the change from the volume managers. The partition manager 201 then waits for notification that the disk has been disconnected (block 351).

When the volume managers approve the change, the operating system 205 disconnects the disk and notifies the partition manager 201. The partition manager 201 removes the affected partitions from the control of the corresponding volume managers (block 353) and updates its data structure 203 to reflect the deletion of the disk (block 355).

The partitions on a disk can also become unavailable because the disk fails, is accidentally powered off, or is physically removed from the computer without warning. FIG. 3D also illustrates the processing in this situation, except that the disk is already "disconnected" and so block 351 is not executed.

The particular methods performed by the partition manager of an exemplary embodiment of the invention have been described. The methods performed by the partition manager has been shown by reference to flowcharts including the illustrated blocks from 301 to 357.

MICROSOFT WINDOWS NT® 5.0 Implementation

In this section of the detailed description, a particular implementation of the invention is described that executes as part of the MICROSOFT WINDOWS NT® 5.0 operating system kernel. In the implementation illustrated in FIG. 4, the partition manager 401 and four other kernel modules work together to provide a user with access to data stored on a physical storage device 413 (shown as a fixed hard disk): a plug and play manager 405, an object manager 407, a mount manager 409, and two volume managers 411, 412. As will be readily apparent to one skilled in the art, the allocation of functions among the modules can be modified without exceeding the scope of the invention.

Because MICROSOFT WINDOWS NT®5.0 is an object-based operating system, every device, either physical, logical or virtual, within the system is represented by a device object. The objects are organized into a device hierarchy in a global namespace controlled by the object manager 407.

Figure 4:
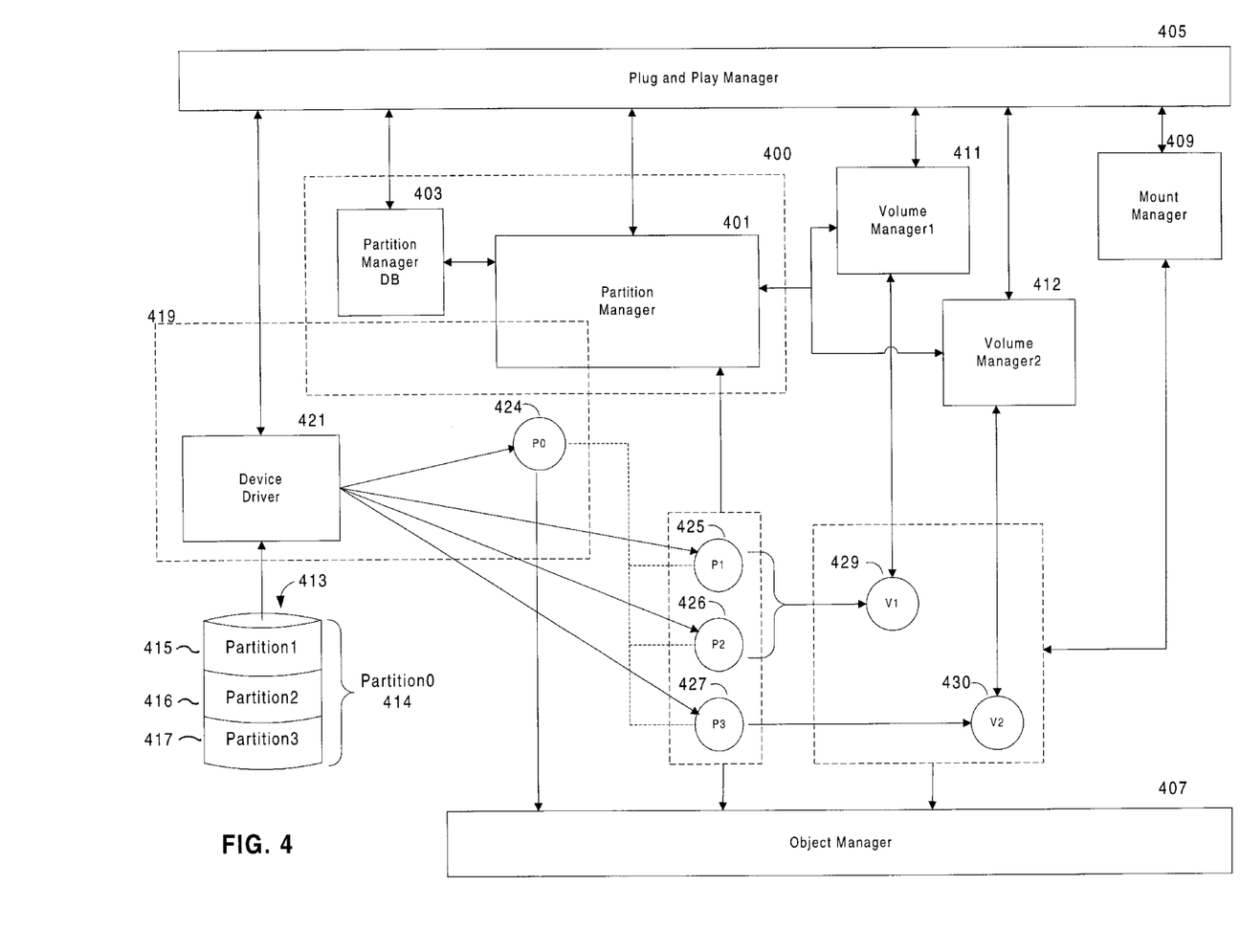
FIG. 4 is a diagram illustrating a particular embodiment of the invention in a MICROSOFT WINDOWS NT® environment.

Upon initialization, the partition manager 401 embeds itself into the disk stack 419 of the computer. The disk stack 419 is used by the device drivers, such as device driver 421, to register partition device objects representing partitions present in the system with the plug and play manager 405. The partition manager 401 requests that the plug and play manager 405 notify the partition manager 401 when a volume manager registers with the plug and play manager 405.

When the fixed hard disk 413 is detected, the plug and play manager 405 invokes the device driver 421 to handle access to the data on the disk 413. The device driver 421 enumerates partition device object P0 424, P1 425, P2 426 and P4 427 to correspond to the fixed disk partition0 414, partition1 415, partition2 416, and partition3 417. Partition0 414 and the corresponding partition device object P0 424 ("parent device object") represent the entire disk 413. Each partition device object 424–427 is stored by the object manager 407 in the device hierarchy by its device name.

As each child partition device object 425–427 is enumerated, the partition manager 401 captures the object from the disk stack 419 before it can be registered with the plug and play manager 405. The partition manager 401 presents each partition device object 425–427 to the volume managers 411–412 in the order in which the volume managers registered with the plug and play manager 405. Because each partition device object 425–427 is associated with at least one logical volume, the volume manager responsible for the corresponding logical volume(s) accepts the device object. As shown in FIG. 4, volume manager 411 accepts partition device objects 425 and 426, while volume manager 412 accepts partition device object 427. The partition manager 401 creates an entry for each partition device object 425–427 in its data structure 403.

When a volume manager 411–412 has received a sufficient number of partition device objects corresponding to a particular logical volume, the volume manager enumerates a volume device object for the logical volume. Thus, volume manager 411 enumerates volume device object 429 for to the logical volume V1, while volume manager 412 enumerates volume device object 430 for the logical volume V2 as shown in FIG. 4. The volume device object contains a device name and a unique volume identifier for the corresponding logical volume. In the NT 5.0 embodiment, the volume device name is guaranteed to be unique during a boot session, while the unique volume identifier is guaranteed to uniquely identify the device in the computer across multiple boot sessions. The volume device objects 429–430 are stored by the object manager 407 in the device hierarchy by their device names. The volume managers 411, 412 also inform the plug and play manager 405 of the creation of the volume device objects 429, 430.

A volume manager determines when it should enumerate logical volumes based on various criteria. If, for example, the volume to be enumerated is a striped set, in one embodiment, the volume manager enumerates new a device object for the volume when it can reconstruct all the data on the logical volume with the partitions that have been presented.

Each volume device object 429–430 is presented to the mount manager 409 by the plug and play manager 405 when the volume device object is registered. The mount manager is responsible for "mounting" the logical volume at a pre-defined location in the global namespace of the computer and creating a symbolic link object for a user-friendly name for the logical volume. The symbolic link object contains the device name of the logical volume object so that the correct device driver is invoked when the user-friendly name is referenced.

The partition manager 401 communicates with the volume managers 411–412 through an application program interface (API) having three calls:

PartitionArrives (child partition device object, parent partition device object);

PartitionRemoved (child partition device object, parent partition device object/null); and QueryDependentVolumes (child partition device object, parent partition device object).

Each device object argument is a pointer or a "handle" to the specified device object.

The interface between the partition manager 401 and the volume managers 411–412 is identified by a 16-byte globally unique identifier ("GUID") called the "volume_manager_GUID." Any volume manager that registers with the plug and play manager 405 as supporting the volume_manager_GUID must implement the PartitionArrives, PartitionRemoved, and QueryDependentVolumes calls. The hexadecimal representation of a GUID is xxxxxxxx-xxxx-xxxx-xxxx-xxxxxxxxxxxx. A GUID is comparable to the UUID (universally unique identifier) specified by the Open System Foundation. A GUID is generated by a call to "CoCreateGUID."

The call, PartitionArrives, is used by the partition manager 401 to present the specified child partition device object to each volume manager 411–412. The call also includes the handle to the parent partition device object so the volume manager can query the format information on the underlying physical disk.

When a disk is being deleted from the system, the plug and play manager 405 needs to inform the appropriate volume managers 411–412 of the removal of the associated logical volumes and, in the case of a deliberate deletion, wait for their approval before disconnecting the disk. The plug and play manager 405 informs the partition manager 401 that a disk is being deleted and the partition manager 401 searches its data structure 403 to identify which volume manager(s) 411–412 manage the affected child partition(s). The partition manager 401 queries the identified volume manager(s) 411–412 using the QueryDependentVolumes call to determine the dependency information needed by the plug and play manager 405 for each affected child partition. The identified volume manager(s) 411–412 return a list of logical volumes that are dependent upon the specified child partition; the partition manager 401 passes the list to the plug and play manager 405. When the disk is disconnected, the partition manager 401 removes the affected child partition(s) from the control of the appropriate volume manager 411–412 by specifying the handle for the corresponding child partition device object in a PartitionRemoved call and a null argument as the parent partition device object handle.

The partition manager 401 specifies the handle for the appropriate parent partition device object, as well as that for the affected child partition, in a PartitionRemoved call to the appropriate volume manager 411–412 when a child partition is being removed because the disk is being reformatted.

This section has described a particular implementation of the partition manager executing as part of the MICROSOFT WINDOWS NT® 5.0 kernel. The processing of the acts described in the previous section have been related to the interface between the plug and play manager and the partition manager, and to the interface between the partition manager and the volume manager(s).

CONCLUSION

A partition manager and supporting data structure has been described which enables the dynamic creation, reconfiguration, and deletion of logical volumes as non-removable storage devices are introduced, reconfigured, or deleted in a computer system by assigning partitions on an introduced device to volume managers which create the logical volumes, and by removing the assignment when partitions are inaccessible by the system due to the deletion or reconfiguration of the storage device. Because the partition manager interjects a level of indirection in the addressing of logical volumes, the addressing is independent of the underlined partitions that comprise a logical volume. Therefore, the physical characteristics of a logical volume can change dynamically without the necessity of modifying the higher layers of the operating system and the user applications that reference the logical volume. Furthermore, in an object-based operating system, the partition manager manages the interface between the partition device objects and the operating systems so that standard operations on the partitions do not require modification.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to is meant to include all hardware and software platforms. Therefore, it is manifestly intended that this invention be limited only by the following claims and equivalents thereof.

We claim:

1. A computerized method for managing partitions on storage devices in a computer system running an operating system that has a volume manager managing logical volumes and a partition manager managing partitions that are available for association with the logical volumes, the method comprising:

capturing a partition when it is enumerated from a storage device;

presenting the captured partition to the volume manager;

assigning control of the captured partition to the volume manager; and associating the captured partition with the volume manager, wherein the captured partition may be removed or replaced with another captured partition without requiring that the higher layers of the operating system and user applications modify the addresses of the logical volumes.

2. The computerized method of claim 1, further comprising:

requesting notification when a volume manager registers; and presenting the captured partition to each registered volume manager in registration order.

3. The computerized method of claim 1, further comprising:

determining the volume manager associated with a captured partition that is removed from the system;

removing the captured partition from the control of the associated volume manager; and disassociating the captured partition and the volume manager.

4. The computerized method of claim 1, further comprising:
 identifying which captured partitions are on a storage device being deleted from the system;
 determining the volume manager associated with each identified captured partition;
 querying the volume manager for each identified captured partition to create volume dependencies;
 removing each identified captured partition from the control of the associated volume manager; and
 disassociating each identified captured partition and the volume manager.

5. The computerized method of claim 4, further comprising: informing an operating system of the volume dependencies.

6. The computerized method of claim 5, wherein the identified captured partitions are removed from the control of the associated volume manager after the operating system has disconnected the storage device.

7. The computerized method of claim 1, wherein the association between a captured partition and a volume manager are stored in a data structure.

8. The computerized method of claim 7, wherein the data structure is created in the computer system memory when the computer is booted.

9. The computerized method of claim 1, wherein the captured partition is incorporated into a logical volume with other captured partitions.

10. The computerized method of claim 1, wherein the relationship between the captured partition and a corresponding enumerated logical volume, the logical volume being comprised of at least one captured partition, is selected from the group consisting of one-to-many, many-to-one, and one-to-one.

11. A computer system running an operating system that has a volume manager managing logical volumes and a partition manager managing partitions that are available for association with the logical volumes, the method comprising:
 a processing unit;
 a system memory coupled to the processing unit through a system bus;
 a computer-readable medium coupled to the processing unit through a system bus; and
 a partition manager, which is executed from the computer-readable medium by the processing unit, causing the processing unit to capture a partition enumerated from the computer-readable medium, presenting the captured partition to a volume manager, assigning control of the captured partition to the volume manager, and creating an association between the captured partition and the volume manager, wherein the captured partition may be replaced with another captured partition without requiring that the higher layers of the operating system and user applications modify the addresses of the logical volumes.

12. The computer system of claim 11, wherein the partition manager further causes the processing unit to store the association between the captured partition and the volume manager in system memory.

13. The computer system of claim 11, wherein the partition manager further causes the processing unit to notify the partition manager when a volume manager registers, and causes the processing unit to present the captured partition to each registered volume manager in registration order.

14. The computer system of claim 11, wherein the partition manager further causes the processing unit to identify a partition that is no longer available in the system, to remove the identified partition from the control of the associated volume manager, and to delete the association between the captured partition and the volume manager.

15. The computer system of claim 14, wherein the partition manager further causes the processing unit to disassociate the identified partition and the volume manager.

16. The computer system of claim 11, wherein the partition manager further causes the processing unit to querying the volume manager for the identified captured partition to create volume dependencies in system memory.

17. The computer system of claim 11, wherein the partition manager further causes the processing unit to incorporate the captured partition into a logical volume with other captured partitions.

* * * * *